TAPE RECORDER HEAD SHIFTING MECHANISM

Filed March 8, 1965

Masato Matsumoto,
Yukihide Samejima and
Kazunari Watanabe

INVENTORS

BY Wenderoth,
Lind and Ponack, attys

Masato Matsumoto
Yukihide Samejima and
Kazunori Watanabe
INVENTORS

BY Wenderoth
Lind and Ponack, attys

Masato Matsumoto
Yukhide Samejima
Kazunari Watanabe
INVENTORS

BY Wenderoth, Lind and Ponack, Attys

United States Patent Office 3,426,162
Patented Feb. 4, 1969

3,426,162

TAPE RECORDER HEAD SHIFTING MECHANISM

Masato Matsumoto and Yukihide Samejima, Tokyo-to, and Kazunari Watanabe, Kawaguchi-shi, Japan, assignors, by direct and mesne assignments, of one-third each to Corona Kogyo Kabushiki Kaisha, Adachi-ku, Kabushiki Kaisha Copal, and Kabushiki Kaisha Tec, Tokyo-to Japan, joint-stock companies Filed Mar. 8, 1965, Ser. No. 437,917
Claims priority, application Japan, Mar. 9, 1964, 39/12,790, 39/12,791; Mar. 10, 1964 (utility model), 39/18,491
U.S. Cl. 179—100.2 1 Claim
Int. Cl. G11b *5/00;* G05g *11/00*

ABSTRACT OF THE DISCLOSURE

A channel selection device for a tape recorder employing a multichannel tape. A helical cam shaft having a helical groove and driven by a channel selecting member has the edge of a shifting plate which is guided on a guide shaft engaged in the helical groove. Rotation of the channel selecting member moves the shifting plate, which carries the transducer head, vertically along the guide shaft. A click device is provided to set the head exactly at a position corresponding to the channel selected by the channel selecting member.

This invention relates to tape recorders and more particularly to a new tape recorder wherein a multichannel magnetic tape is used.

More specifically, the invention concerns a tape recorder employing a multichannel magnestic tape having one special channel capable of recording, reproducing (play back), and erasing and any desired number of recorded channels, the tape recorder being capable of operations such as recording in the special channel various combinations of sounds reproduced from the recorded channels and recording combinations of sounds reproduced from the recorded channels with entirely new, other sounds. The tape recorder of the invention is thereby highly useful for conversation practice and music practice.

Among known tape recorders of this general type, there is one type provided with the same number of heads as the number of channels. This known tape recorder, however, is disadvantageous in that not only is much space required for installing the heads, but also, since all of the heads are caused to contact constantly a magnetic tape, the wear of said tape is severe, whereby this tape recorder is unsuitable in the case of a large number of channels.

Furthermore, in order to protect the tape in this known tape recorder, the switching device for switching between recording, reproducing, and rewinding is, in general, so adapted that switching cannot be effected from rewinding directly to recording or reproducing, and the tape must always be positively stopped prior to the succeeding operation. Moreover, the known type of switching device is operated by a lever. Consequently, it has been difficult to carry out switching operations in a smooth manner in known tape recorders of this type wherein frequent switching between recording, reproducing, and rewinding must be carried out.

In view of the above considerations, it is a general object of the present invention to overcome the above described difficulties accompanying known tape recorders of this type.

More specifically, it is as object of the invention to provide a tape recorder in which an erasing head and a recording head are fixed in positions to contact a special channel of a multichannel magnetic tape, which, moreover, is adapted to be shiftable in its width direction so that a reproducing head can contact all channels of the tape. By this provision, there are afforded the advantages of simplified construction of the entire tape recorder, easy design, miniaturization, low incidence of trouble, and low cost.

Another object of the invention is to provide a tape recorder employing a multichannel magnetic tape, which tape recorder is provided with a lever type switching device having a simple construction and easy operation. By this provision, in spite of the impossibility of switching from rewinding directly to recording or reproducing, switching directly between recording and reproducing can be accomplished in a smooth manner.

A further object of the invention is to provide a tape recorder employing a multichannel magnetic tape, in which tape recorder a channel selection device and a head block are constructed integrally as one unit. This construction solves the problem due to the necessity, in this type of tape recorder, to provide positive coupling of the channel selection device and the reproducing head and accurate movement of the reproducing head. Accordingly, the assembly and adjustments of the tape recorder are greatly simplified.

The nature, principle, and details of the invention, as well as further characteristic features and advantages thereof, will be more clearly apparent from the following detailed description with respect to a preferred embodiment of the invention when read in conjunction with the accompanying drawings in which like parts are designated by like reference characters, and in which.

Figure 1:
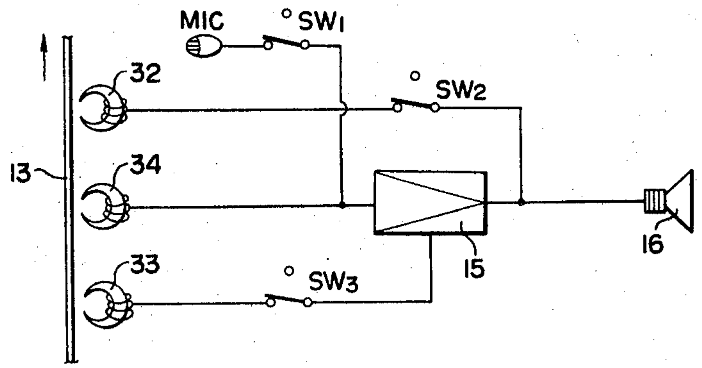
FIG. 1 is a schematic diagram for a description of the principle of the tape recorder according to the invention.
Figure 3:
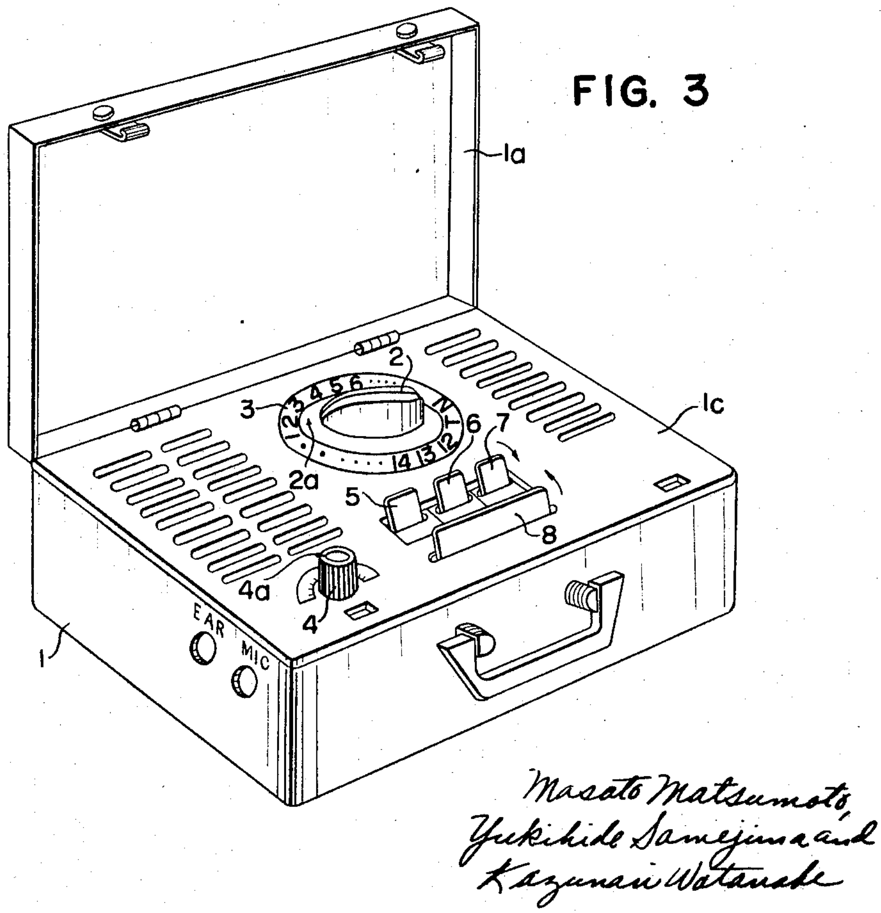
FIG. 3 is a perspective view showing the general appearance of the tape recorder of the invention with its front lid opened.

Referring to the drawings, the tape recorder embodying the invention is enclosed within a housing 1 provided with a front lid $\mathbf{1}_a$ on one side and a rear lid $\mathbf{1}_b$ on the opposite side. The lid $\mathbf{1}_a$ protectively covers a control panel $\mathbf{1}_c$ and control knobs and levers mounted thereon, namely, a channel selection knob 2 having an indication marker $\mathbf{2}_a$ to indicate channels marked on a channel scale 3 fixed to the panel $1_c$, a volume adjusting knob 4 having an indication marker $4_a$, a rewinding lever 5, a reproducing lever 6, a recording lever 7, and a lock lever 8, said levers 5, 6, 7, and 8 being designed and grouped for efficient manipulation as will be described hereinafter. A desired channel is selected by turning the channel selection knob 2 to set the marker $2_a$ at the symbol (numeral) corresponding to said desired channel.

Figure 2:
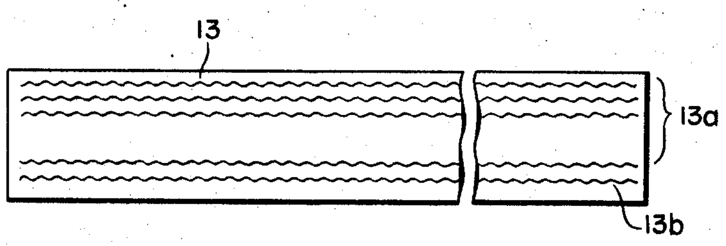
FIG. 2 is a planar view showing a multichannel magnetic tape suitable for use in the recorder of the invention.
Figure 4:
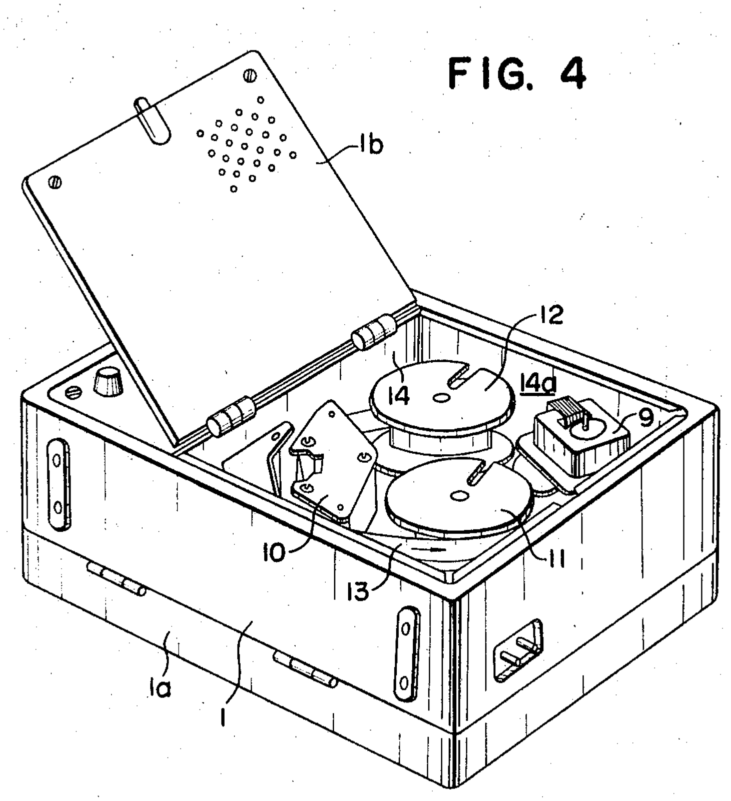
FIG. 4 is a perspective view showing the general appearance of the tape recorder of the invention with its rear lid opened.

The read lid $1_b$ protectively covers a chamber $14_a$ containing an electric motor 9, a head block 10, a take-up reel 11, and a supply reel 12, the reels 11 and 12 accommodating a magnetic tape 13. The magnetic tape 13 is provided with a large number of recorded channels $13_a$ and a special channel $13_b$ which is capable of being used for recording, reproducing, and erasing as shown in FIG. 2 and described hereinafter. A partition 14 separates the chamber $14_a$ from another chamber which contains an amplifier device 15, a loudspeaker 16 and other parts.

Figures 5, 6, 7:
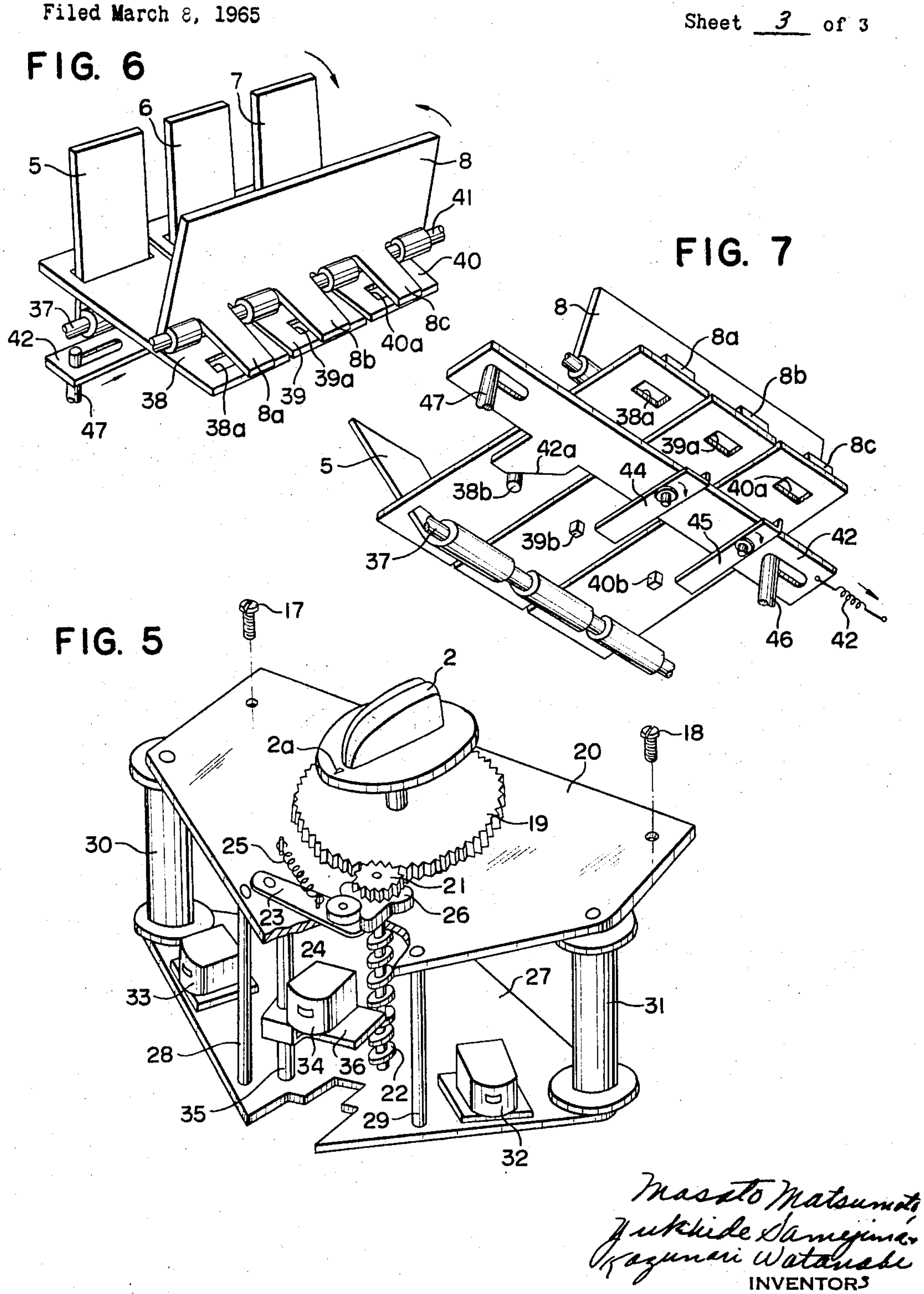
FIG. 5 is a perspective view, with a part cut away, showing a unit comprising heads and a channel selection device for use in the tape recorder of the invention.
FIG. 6 is a perspective view of a switching device suitable for use in the tape recorder of the invention.
FIG. 7 is a perspective view from a position below the view shown in FIG. 6.

The head block 10, which is shown in detail in FIG. 5, is secured to the interior side of the panel $1_c$ by screws 17 and 18 in a readily mountable and dismountable manner. The block frame structure essentially comprises an upper plate 20 and a lower plate 27 connected by parts such as tape guide shafts 28 and 29 and the shafts of tape guide rollers 30 and 31, said parts thus serving additionally as structural columns.

The channel selection knob 2 is fixed to the upper end of a shaft which is rotatably supported on the upper plate 20 and supports a gear 19 fixed thereto. Rotation of the knob 2 is transmitted through the gear 19 and a pinion 21 meshed therewith to a helical cam shaft 22 to which the pinion 21 is fixed. A click cam 26 which is also fixed to the cam shaft 22 is constantly contacted by a roller 24 provided at the free end of a click lever 23 pivoted at its other end on the upper plate 20 and rotationally biassed in the counterclockwise direction (toward the click cam 26) by a spring 25.

An erasing head 32 and a recording head 33 are fixedly mounted on the lower plate 27 in positions to contact only the special channel $13_b$ of the magnetic tape 13. A recording head 34 is mounted on a shifting plate 36 which is engaged with the helical groove of the helical cam shaft 22 and caused by the rotation of the shaft 22 to shift its position vertically along a guide shaft 35. Accordingly, the recording head 34 is capable of contacting all channels $13_a$ and $13_b$ of the magnetic tape 13.

Referring to FIGS. 6 and 7, the rewinding lever 5, the reproducing lever 6, and the recording lever 7 are supported pivotally at their respective lower ends on a shaft 37 fixed to a structural part of the housing 1 and are respectively biassed by separate springs (not shown) in the direction counter to that indicated by the arrow in FIG. 6. Manipulation of the levers 5, 6, and 7 causes sliding movement of a rewinding switching bar 38, a reproducing switching bar 39, and a recording switching bar 40, respectively, which are provided respectively with slots $38_a$, $39_a$, and $40_a$ and with pins $38_b$, $39_b$, and $40_b$ on their bottom surfaces.

The lock lever 8 is pivotally supported on a shaft 41 fixed to a structural part of the housing 1 and is biassed by a spring (not shown) in the direction counter to that indicated by the arrow in FIG. 6. This lock lever 8 is provided with arms $8_a$, $8_b$, and $8_c$ in alignment for engagement with slots $38_a$, $39_a$, and $40_a$, respectively, of the switching bars 38, 39, and 40, and when the switching bars 38, 39, and 40 are actuated in the arrow direction, they are thereby engaged and held in their respective operational positions.

A transverse slide bar 42 is supported in a position below the switching bars by columns 46 and 47 fixed to a structural part of the housing 1 and is biassed by a spring 43 in the arrow direction. This slide bar 42 has a cam portion $42_a$ confronting the pin $38_b$ of the switching bar 38 and pivotally supports obstructing levers 44 and 45, which are biassed by respective springs in the direction of the arrows shown in FIG. 7. These levers 44 and 45 are so disposed that their extreme ends can be placed in the paths of pins $39_b$ and $40_b$, respectively.

The tape recorder of the present invention is operated in the following manner.

In the case when recorded sound is to be reproduced and recorded in the special channel of the magnetic tape, and then a new sound is to be recorded through a microphone MIC, the recording lever 7 is first manipulated in the arrow direction, whereby the movement of this lever is transmitted through a suitable interconnecting mechanism (not shown) to close switches $SW_1$, $SW_2$, and $SW_3$. The channel selection knob 2 is turned until the marker $2_a$ coincides with the numeral on the scale 3 of the channel to be reproduced, whereupon the movement of the knob 2 is transmitted through the gear 19, pinion 21, and cam shaft 22, and the shift plate 36 is moved along the guide shaft 35. Accordingly, the reproducing head 34 is caused to contact the selected one of the recorded channels $13_a$ of the magnetic tape 13.

The sound of the recorded channel so reproduced by the reproducing head 34 is recorded through the recording head 32 into the special channel $13_b$. During this step, the sound being reproduced can be listened to at the same time through the loudspeaker 16.

Next, the channel selection knob 2 is turned to cause the marker $2_a$ to coincide with a character N on the scale 3, whereupon the reproducing head 34 is caused to contact the special channel $13_b$. Then, through the microphone MIC, another sound is passed through the recording head 32 and recorded in the special channel $13_b$.

When the rewinding lever 5 is thereafter manipulated in the arrow direction, the recording lever 7 is returned to its initial position, whereby the switches $SW_1$, $SW_2$, and $SW_3$ are opened, and, at the same time, the magnetic tape is reversed at high speed. Then, when the lock lever 8 is moved in the arrow direction, the rewinding lever 5 is also returned, and the electric motor 9 stops. When the reproducing lever 6 is moved in the arrow direction, the motor 9 operates, and the aforementioned two sounds recorded in the special channel $13_b$ are consecutively reproduced in sequence.

The lever type switching device shown in FIGS. 6 and 7 operates in the following manner. When the reproducing lever 6 is moved in the arrow direction, the arm $8_b$ of the lock lever 8 engages with the slot $39_a$ of the switching bar 39, whereby the bar 39 is locked.

Next, when the recording lever 7 is moved in the arrow direction, the end of the recording switching bar 40 forces upwardly the arm $8_c$ of the lock lever 8. Consequently, the arm $8_b$ is disengaged from the slot $39_a$, and the switching bar 39 returns to its initial position, the recording switching bar 40 in turn being locked as its slot $40_a$ is engaged by the arm $8_c$.

However, when the rewinding lever 5 is moved in the arrow direction, the transverse slide bar 42 is moved in the direction counter to the arrow direction by the pin $38_b$ of the switching bar 38. Therefore, even if either of the reproducing and recording levers 6 and 7 is moved in the arrow direction with the device in this condition, the pin $39_a$ of the switching bar 39 or the pin $40_b$ of the switching bar 40 will abut against the end of the obstructing lever 44 or 45, whereby the lever 6 and its bar 39 or the lever 7 and its bar 40 will be prevented from moving further. Accordingly, in this case the lever 6 or lever 7 must be manipulated after the lock lever 8 has been moved in the arrow direction to cause the rewinding lever to return.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What we claim is:

1. A channel selection device for a tape recorder employing a multichannel tape, said device comprising: a channel selecting member; a helical cam shaft provided with a helical groove, gear means gearing said cam shaft to said channel selecting member for rotating said cam shaft by selecting operation of said channel selecting member; a guide shaft; a flat thin shifting plate having an edge thereof engaged in the helical groove of said helical cam shaft and slidable on said guide shaft to shift its position vertically along said guide shaft by rotation of said cam shaft; an electro-magnetic transducer head mounted on said shifting plate; and a click device including a click cam fixed on said cam shaft, an arm pivoted on said tape recorder and, having a cam stop thereon engaged with said click cam, spring means biasing said arm in a direction to urge said cam stop against said click cam, and setting said head exactly at position corresponding to the channel selected by said channel selecting member.

References Cited

UNITED STATES PATENTS 2,513,423 7/1950 Owens ----------- 179—100.2

STANLEY M. URYNOWICZ, Jr., *Primary Examiner.*

J. R. GOUDEAU, *Assistant Examiner.*

U.S. Cl. X.R.

74—483, 527; 340—174.1